United States Patent Office 2,878,679
Patented Mar. 24, 1959

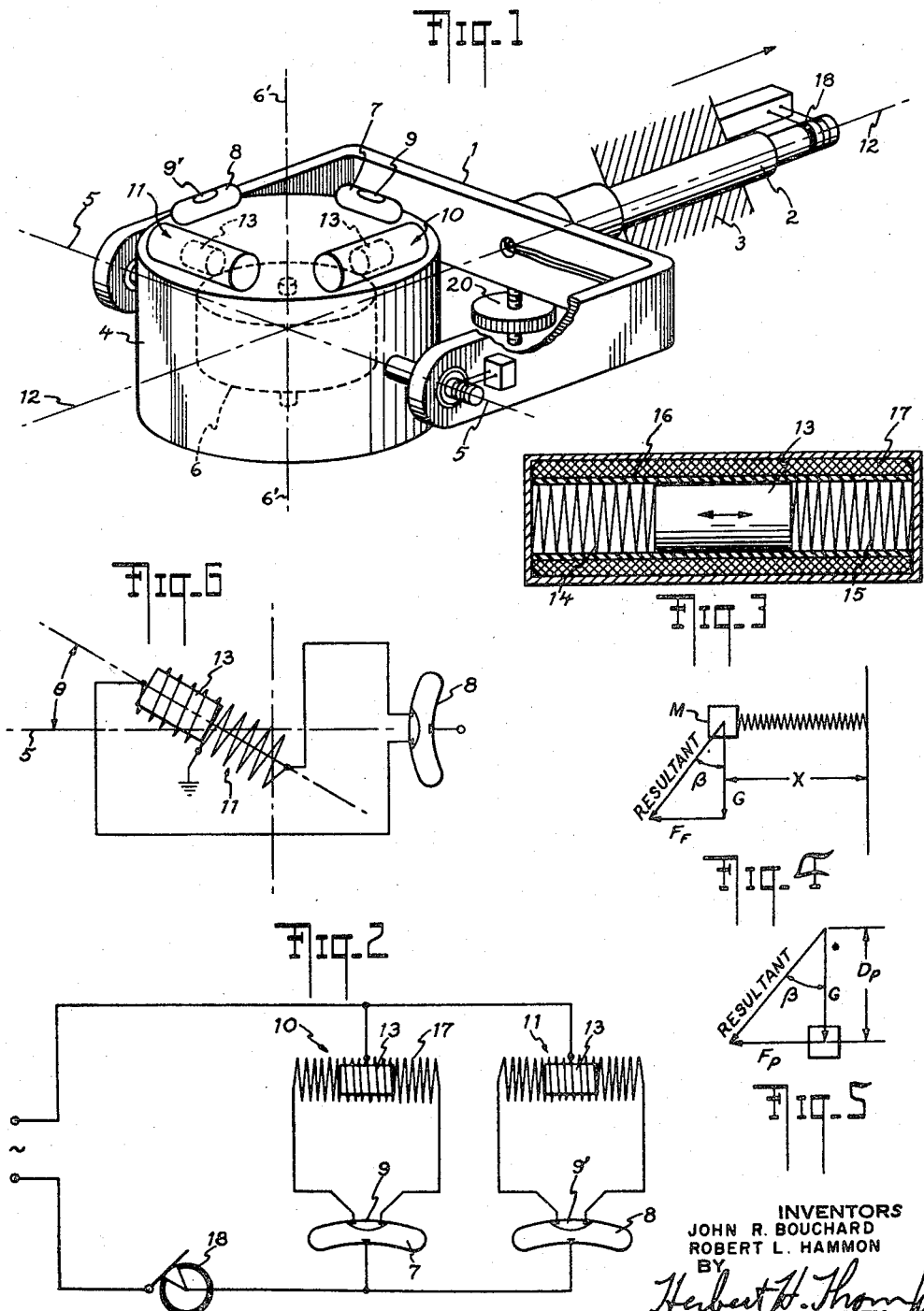

2,878,679

COMPENSATED GYRO VERTICAL

John R. Bouchard, Norwood, Mass., and Robert L. Hammon, Fresh Meadows, N.Y., assignors to Sperry Rand Corporation, Great Neck, N.Y., a corporation of Delaware Application December 19, 1956, Serial No. 629,294

9 Claims. (Cl. 74—5.44)

This invention relates to gyroscopic instruments for indicating the vertical by maintaining a stabilized horizontal reference plane. Such instruments are usually in the form of a gyro vertical, the spin axis of which is maintained vertical by gravitationally responsive or tilt detecting means controlling torquers acting about horizontal axes normal to the axes about which the tilt has occurred. Many forms of such erection devices are known but in all of them the gyroscope is subject to deviation from the vertical under the action of prolonged turns or other acceleration forces unless some compensating means is employed (such as inclining the spin axis forwardly) or the erection device affected by the turn is cut out or materially modified during the turn.

More especially, our invention relates to the latter type of gyro vertical, and especially to one in which gravitational means responsive to tilt are in the form of liquid levels mounted on the gyroscope and the torquers are in the form of a shiftable mass or masses which normally do not disturb the balance of the gyro about its two horizontal axes, but which are shifted to exert an erecting torque on the gyroscope when relative tilt occurs between the liquid level and the gyro which is about the proper axis and in the proper direction to correct the tilt. Preferably, we sever the control from at least the liquid level affected by turn of the ship and the torquer controlled thereby when the relative tilt between the gyro and liquid level exceeds a predetermined small value such as 6°, since the error produced in the system by turns at a less bank angle may be neglected. Above this bank angle, however, we render at least the roll erection device inoperative so that the shiftable mass should remain centralized in its neutral position. However, during turns, centrifugal forces caused thereby will cause a shift in the position of this mass and also the center of gravity of the sensitive element with respect to its pivotal axes due to gimbal deflection and other effects, giving rise to a small turn induced error in the gyroscope. By our invention, we devise a means for overcoming this error and also for compensating for slight error caused in such gyro verticals by the shift in the position of the air bubbles in the liquid level affected by the banked turn.

The purpose of our invention is, therefore, to improve the accuracy of gyro verticals by providing a means to correct for any or all of the errors mentioned above. Other objects of the invention will be apparent from the following description and appended claims.

Referring to the drawings showing the preferred form of the invention:

Fig. 1 is a diagrammatic perspective view of a gyro vertical embodying our invention;

Fig. 2 is an elementary wiring diagram of the same;

Fig. 3 is a vertical section through one of the torquing devices of the gyro;

Figs. 4 and 5 are two diagrams illustrating the theory of my invention for preventing turn errors due to shift of the center of gravity and/or the torquing mass during turns; and Fig. 6 is a diagrammatic view showing a modified form of the invention to correct for the slight error due to shift in the center of gravity of the liquid level device during turns.

The gyro vertical shown in the drawings is represented as universally mounted by means of open front gimbal ring 1 which is pivotally mounted at the rear by means of a long trunnion 2 extending from the gimbal ring and journaled in a bearing 3 in the fixed support, which bearing is usually placed in a fore and aft direction 12—12 on the aircraft. The rotor case or casing 4 is in turn journaled on transverse horizontal axis 5—5 within the gimbal ring and the rotor 6 is journaled within the case on a normally vertical spin axis 6'—6'.

For maintaining the gyro in an erected condition, it is slaved to gravity by gravitationally responsive means such as liquid levels 7 and 8 preferably mounted on the gyro case, level 7 being responsive to relative tilt of the gyro and level in roll about axis 12—12, and level 8 responsive to relative pitch of the gyro and level about axis 5—5. Such levels are usually partially filled with a conducting liquid leaving an air bubble 9 which, of course, is displaced from its centralized position upon tilt of the level. Level 7 controls the torquing device 10 acting about the pitch or transverse axis 5, while level 8 controls the torquing device 11 acting about the roll or fore and aft axis 12. Each torquer is shown in the form of a free mass or slug 13 which is preferably normally centralized by springs 14 and 15 within the tube or core 16 of the solenoid winding 17 on the gyro casing 4. Preferably, the solenoid is in two parts or mid-tapped so that when the liquid is level the slug of magnetic material is in its centralized position under the influence of the centralizing springs. Upon tilt of the level, however, one end of the winding becomes energized more than the other so that the slug is displaced from its centralized position and thereby causes gravity to exert a torque about the horizontal axis of the gyroscope at right angles to the tilt.

When, however, the bank exceeds a predetermined small value such as approximately 6° the circuit is broken to the supply source so that the erection system becomes inoperative for bank angles exceeding 6°.

In Figs. 1 and 2, we have shown such a switch at 18 as affecting both the bank and pitch controllers 7 and 8, but if desired the switch may render inoperative only the bank controller. During turns at a rate great enough to cause a bank angle greater than 6°, the one or both erection devices are cut out and, therefore, the slug 13 within solenoid 11 when acted upon by centrifugal force would move away from its centralized position, for example, to compress spring 15 an amount proportional to the rate of turn and air speed. Due to the elastic characteristics in the materials used in any gimbal and bearing gyro assembly, some degree of mass shift will also develop along the pitch axis (or about the roll axis) of the gyro vertical due to centrifugal acceleration during a turn. Thus there is exerted an unwanted and disturbing torque on the gyro along the pitch axis (about the roll axis). By analysis of the forces involved, as will now be explained in connection with Figs. 4 and 5, we compensate for this error producing shift by making the gyroscope slightly pendulous about the roll or fore and aft axis 12—12. This may readily be accomplished by making the gimbal ring 1 pendulous, as represented by the vertically adjustable weight 20 secured to the bottom thereof under the axis 12—12, and adjusting the weight to neutralize both sources of error, as now demonstrated.

Since during turns in an aircraft both gyro and solenoid mass shifts are relatively linear variables, their displacement in a turn may be represented by a mass M, attached to a spring, and acted upon by centrifugal force. Referring to Fig. 4 in which, $X$ = center of gravity shift during a turn
$K$ = linear stretch rate of spring subject to a force ($F_F$)
$F_F$ = centrifugal force due to turn
$G$ = force of gravity
$T_M$ = torque caused by shift of center of gravity Then, we may write:

$$F_F = KX$$
$$F_F = MG \tan \beta$$
$$T_M = MGX$$

$$X = \frac{MG \tan \beta}{K}$$

$$T_M = MG \left[ \frac{MG \tan \beta}{K} \right]$$

$$T_M = \frac{(MG)^2}{K} \tan \beta$$

Since $\frac{(MG)^2}{K}$ = a constant ($C_1$) for a given gyro and gimbal configuration, we may say $T_M = C_1 \tan \beta$.

The effect of pendulosity in a vertical gyro during a turn can be analyzed by considering a simple pendulum as indicated in Fig. 5, where $F_P$ = centrifugal force on pendulum
$D_P$ = lever arm of mass
$M_P$ = mass of pendulum
$T_P$ = torque caused by centrifugal force acting on pendulum Then
$$F_P = M_P G \tan \beta$$
$$T_P = F_P D_P$$
$$T_P = M_P G D_P \tan \beta$$

Since $(M_P G D_P)$ = a constant ($C_2$), we may say that: $T_P = C_2 \tan \beta$.

It is evident, therefore, that $M_P D_P$ (pendulosity) may be chosen so that $C_1 = C_2$ which results in:

$$T_M = T_P$$

which represents a condition of perfect compensation. This analysis assumes a linear spring rate K, a condition which is not absolutely true in an actual instrument where non-linearities in the bearings and gimbals may be found. The errors introduced by virtue of these non-linearities are, however, of relatively small significance over a wide range of bank angles and may be compensated for by employing a combination of centralizing springs having a non-linear spring rate.

In the erection system so far described, the correcting torque is either off or full-on in one direction or the other. In other words, it is a step function and not proportional to the amount of tilt because when the solenoid is excited it would pull the slug to one end or the other of the cylinder against the action of the weak springs. Under some situations, however, it is desirable to have the torque exerted by the slug a linear function with respect to the tilt. One method of approximating this idea is to use relatively stiff centralizing springs so that the movement of the mass will be proportional to the strength of the excitation of the solenoid together with a liquid level design giving an output proportional to tilt over a fair range.

To correct for the slight torque on the gyro caused by a shift in the position of the air bubble upon tilt or acceleration, we propose to position at least the pitch correcting solenoid containing the slug 13 which is responsive to the liquid level 8 at an angle to the lateral axis of the craft 5—5 so as to obtain a torque component about pitch axis 5—5 equal and opposite to that caused by the shift in the liquid level due to pitch about axis 5—5. In such case the primary torque requirement about axis 12—12 caused by the shift should be increased by the factor $$\frac{1}{\cos \theta}$$

$\theta$ being the angle that the solenoid is turned away from the axis 5—5. The same correction should be employed about the roll axis with the system described herein, but this type of correction would not appear practical in a turn error correction system in which the control of the torque producing members from the respective liquid levels are transferred or criss-crossed during turns, as proposed in the patent to Adkins, No. 2,542,975.

While we have described our invention in its preferred embodiments, it is to be understood that the words which we have used are words of description rather than of limitation and that changes within the purview of the appended claims may be made without departing from the true scope and spirit of our invention in its broader aspects.

What is claimed is:

1. In a universally pivoted gyro vertical, a tilt detector, reversible signals produced thereby for tilts in opposite directions about a horizontal axis, a reversible torquer controlled by said signals for exerting erecting torques on the gyro and including a mass movably mounted on said gyro in a horizontal plane so as to displace the center of gravity thereof to one side or the other of a second horizontal axis normal to said first axis, electromagnetic means controlled by said signals for displacing the mass in a direction to correct the tilt, and means for severing the control of said electromagnetic means from said signals upon bank of the craft exceeding a predetermined angle.

2. In a universally pivoted gyro vertical, a tilt detector, reversible signals produced thereby for tilts in opposite directions about a horizontal axis, a reversible torquer controlled by said signals for exerting erecting torques on the gyro and including a mass movably mounted on said gyro in a horizontal plane so as to displace the center of gravity thereof to one side or the other of a pivotal axis, electromagnetic means controled by said signals for displacing the mass, and means for severing the control of said electromagnetic means from said signals upon bank of the craft beyond a small angle, said gyro having sufficient pendulosity to counterbalance the displacement of said mass by centrifugal forces during turns when said signals are ineffective.

3. In a gyro vertical, a rotor casing, a gimbal ring mounted for oscillation about a fore and aft axis on the craft and pivoting said rotor casing on a transverse axis, a tilt detector producing signals upon tilt, a shiftable mass on said casing controlled by said tilt signals, and means for disconnecting the control of said mass from said signals during turns at more than a predetermined rate, said gimbal ring having sufficient pendulosity about said fore and aft axis to counterbalance the disturbance of the gyro equilibrium due to shift of said mass caused by centrifugal force during turns.

4. In a gyro vertical, a liquid level device mounted on the gyro producing signals upon tilt about an axis, a torque applying device for applying torques about the horizontal axis of said gyro normal to said other axis and controlled by said signals, and means for causing said device to have also a component about said first named axis and counter to the movement of the center of gravity of the liquid level device, whereby the disturbing effect of the movement of the liquid in the liquid level device on the gyro is counteracted by said component torque.

5. In a gyro vertical, a liquid level device mounted on the gyro producing signals upon tilt about an axis, a shiftable mass for applying torques about the horizontal axis of said gyro normal to said other axis and controlled by said signals, and means for causing the movement of said mass to have also a component about said first named axis and counter to the movement of the center of gravity of the liquid level device, whereby the disturbing effect of the movement of the liquid in the liquid level device on the gyro is counteracted by said component movement of said mass.

6. A gyro vertical as claimed in claim 3, in which the center of gravity thereof is subject to shift along said transverse axis during turns and in which said gimbal ring is sufficiently pendulous about said fore and aft axis to counterbalance the disturbance of the gyro equilibrium due to both shift of said mass and shift of the gyro with respect to its gimbal mounting during turns.

7. In a gyro vertical reference instrument for dirigible craft, the combination of, a rotor case supported on the craft with freedom about mutually perpendicular, normally horizontal, fore and aft and athwartship directed, axes; means for normally maintaining the case in an erected condition including a gravity responsive device having an output in accordance with tilt of the case about the athwartship axis, a movable mass mounted on the case to displace the center of gravity thereof with relation to the fore and aft axis and thereby exert an erecting torque about the fore and aft axis, and electromagnetic means mounted on the case responsive to the output of said tilt device to displace said mass; and means providing pendulosity for the case about its fore and aft axis to counterbalance displacement of the mass due to the influence thereon of centrifugal force during turns of the craft.

8. In a gyro vertical reference instrument for dirigible craft, the combination of, a rotor case supported on the craft with freedom about mutually perpendicular, normally horizontal, fore and aft and athwartship directed, axes; means for normally maintaining the case in an erected condition including a liquid level device mounted on the case having an output in accordance with the tilt of the case about the athwartship axis, a movable mass mounted on the case to displace the center of gravity thereof with relation to the fore and aft axis and thereby exert an erecting torque about the fore and aft axis, and electromagnetic means mounted on the case operated by the output of the liquid level device to displace said mass; means for disabling said condition maintaining means during turns of the craft; and means providing pendulosity for the case about its fore and aft axis to counterbalance displacement of the mass due to the influence thereon of centrifugal force during turns.

9. The combination claimed in claim 8, in which the mass and electromagnetic means are arranged on the case at an angle to the athwartship axis to provide a torque component about the axis that counteracts changes in the center of gravity of the liquid level device.

References Cited in the file of this patent

UNITED STATES PATENTS

| | | |
|---|---|---|
| 2,242,806 | Wunsch | May 20, 1941 |
| 2,369,131 | Braddon et al. | Feb. 13, 1945 |
| 2,392,370 | Esval et al. | Jan. 8, 1946 |
| 2,412,204 | Carter et al. | Dec. 10, 1946 |
| 2,468,113 | Russ | Apr. 26, 1949 |

FOREIGN PATENTS

| | | |
|---|---|---|
| 753,258 | Great Britain | July 18, 1956 |